(12) United States Patent
Manahan (10) Patent No.: US 9,191,107 B2
(45) Date of Patent: Nov. 17, 2015

(54) HAZARDOUS LOCATION VISIBLE LIGHT COMMUNICATION NETWORKS

(71) Applicant: Joseph Michael Manahan, Manlius, NY (US)

(72) Inventor: Joseph Michael Manahan, Manlius, NY (US)

(73) Assignee: Cooper Technologies Company, Houston, TX (US)

( * ) Notice: Subject to any disclaimer, the term of this patent is extended or adjusted under 35 U.S.C. 154(b) by 145 days.

(21) Appl. No.: 13/841,875

(22) Filed: Mar. 15, 2013

(65) Prior Publication Data

US 2014/0270798 A1   Sep. 18, 2014

(51) Int. Cl.
*H04B 10/116* (2013.01)
*H04B 10/114* (2013.01)

(52) U.S. Cl.
CPC .......... *H04B 10/116* (2013.01); *H04B 10/1149* (2013.01)

(58) Field of Classification Search
CPC .......................... H04B 10/1149; H04B 10/116
USPC .......................................... 398/130; 455/521
See application file for complete search history.

(56) References Cited

U.S. PATENT DOCUMENTS

| | | | |
|---|---|---|---|
| 7,263,379 B1 * | 8/2007 | Parkulo et al. | 455/521 |
| 8,188,878 B2 * | 5/2012 | Pederson et al. | 340/815.45 |
| 8,204,383 B2 * | 6/2012 | Shin et al. | 398/129 |
| 8,699,887 B1 * | 4/2014 | Rothenberg | 398/172 |
| 2008/0013963 A1 * | 1/2008 | Naoe et al. | 398/202 |
| 2010/0209105 A1 * | 8/2010 | Shin et al. | 398/58 |
| 2011/0243570 A1 * | 10/2011 | Kim et al. | 398/140 |
| 2012/0189313 A1 * | 7/2012 | Pederson et al. | 398/115 |
| 2012/0224860 A1 * | 9/2012 | Kim et al. | 398/128 |
| 2012/0229958 A1 * | 9/2012 | Hughes | 361/673 |

FOREIGN PATENT DOCUMENTS

| | | |
|---|---|---|
| WO | 2010128829 | 11/2010 |
| WO | 2010128838 | 11/2010 |
| WO | 2011014044 | 3/2011 |

OTHER PUBLICATIONS

Surina, E., International Search Report and Written Opinion of the International Searching Authority for PCT/US2014/024924, Jun. 17, 2014, pp. 1-6.

Crouse-Hinds by Eaton, Article 500-516 of the National Electrical Code with Product Recommendations for Use in Hazardous (Classified) Areas, Eaton's Crouse-Hinds 2014 Code Digest, Jan. 2014, pp. 1-128, Eaton Corporation, Cleveland, Ohio.

* cited by examiner

*Primary Examiner* — David Payne
*Assistant Examiner* — Omar S Ismail
(74) *Attorney, Agent, or Firm* — King & Spalding LLP (57) ABSTRACT

A method of communicating a condition in a hazardous location. The method can include determining, using a controller of a first controller communicably coupled to a measuring device, the condition in the hazardous location, and emitting, based on the condition, a first light output from a first light source in the hazardous location. The method can also include receiving, using a second enclosure located in the hazardous location, a visible light communication (VLC) signal from the first light output, and emitting, from a second light source of the second enclosure, a second light output, where the second light output comprises the VLC signal. The method can further include receiving, using a base device, the VLC signal from the second light output, translating the VLC signal into a communication format, and sending the VLC signal in the communication format.

20 Claims, 5 Drawing Sheets

HAZARDOUS LOCATION VISIBLE LIGHT COMMUNICATION NETWORKS

TECHNICAL FIELD

Embodiments described herein relate generally to visible light communication (VLC), and more particularly to systems, methods, and devices for VLC networks in hazardous locations.

BACKGROUND

Visible light communication is a way of allowing devices to communicate with each other using signals embedded within a light output generated by a light source. For example, a light source can receive power and generate a light output. The power received by the light source can include a visible light signal generated by a modulation circuit. When the light source illuminates using the power it receives (including the visible light signal), the light source sends light output (sometimes called a light communication). The light output of the light source can include a visible light communication (VLC) signal and can be received by a receiver. In such a case, the receiver can separate the VLC signal from the light output.

In hazardous locations, communication of a condition (e.g., the status of certain equipment) in the hazardous location can be important. Failure to timely address a situation where equipment is not operating properly can result in a loss of material, a loss of time, a loss of equipment, and, in extreme cases, a loss of life. Thus, communication in hazardous locations can be important. However, communication in such hazardous locations can be impaired because of noise, humidity, extreme temperatures, chemical exposure, vibrations, and/or other conditions that are commonly present in hazardous locations.

SUMMARY

In general, in one aspect, the disclosure relates to a method of communicating a condition in a hazardous location. The method can include determining, using a controller of a first controller communicably coupled to a measuring device, the condition in the hazardous location. The method can also include emitting, based on the condition, a first light output from a first light source in the hazardous location, where the first light output includes a visible light communication (VLC) signal that describes the condition. The method can further include receiving, using a second enclosure located in the hazardous location, the VLC signal from the first light output. The method can also include emitting, from a second light source of the second enclosure, a second light output, where the second light output includes the VLC signal. The method can further include receiving, using a base device, the VLC signal from the second light output, and translating the VLC signal into a communication format. The method can also include sending the VLC signal in the communication format.

In another aspect, the disclosure can generally relate to a visible light communication (VLC) network for a hazardous location. The VLC network can include an enclosure having a first light source and a first modulation circuit, where the enclosure is located in the hazardous location and is communicably coupled to a measuring device, and where the first light source emits a first light output that includes a VLC signal generated by the first modulation circuit. The VLC network can also include a second light source having a first receiver and a second modulation circuit, where the second light source is located in the hazardous location, where the first receiver is within a first line of sight of the first light output emitted by the first light source, and where the second light source emits a second light output that includes the VLC signal generated by the second modulation circuit. The VLC network can further include a base device having a second receiver and a translation module, where the second receiver is within the second line of sight of a second light output emitted by the second light source, and where the translation module translates the VLC signal into a communication format.

These and other aspects, objects, features, and embodiments will be apparent from the following description and the appended claims.

BRIEF DESCRIPTION OF THE DRAWINGS

The drawings illustrate only example embodiments of VLC networks in a hazardous location and are therefore not to be considered limiting of its scope, as VLC networks in a hazardous location may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, methods, and devices for VLC networks in hazardous locations. Specifically, example embodiments may be directed to using VLC in a hazardous location to communicate a condition (e.g., the status of one or more pieces of equipment) in the hazardous location. Further, example embodiments coordinate a network of light sources, modulation circuits, and receivers. Certain example embodiments provide a number of benefits. Examples of such benefits include, but are not limited to, little to no discernable flicker of a light source, improved reliability in communication in a hazardous location, user capability to adjust the settings and output, and no discernable difference in the level of light output by a light source.

Example embodiments described herein can be directed to one or more of a number of different types of light source, including but not limited to light-emitting diode (LED) light sources, fluorescent light sources, organic LED light sources, incandescent light sources, and halogen light sources. Therefore, example embodiments of VLC networks in hazardous locations described herein should not be considered limited to particular type of light source.

Example embodiments described herein are directed to hazardous location enclosures. As defined herein, a hazardous location is any location where the enclosure can be exposed to extreme conditions. Extreme conditions can include, but are not limited to high temperatures, low temperatures, temperature fluctuations, corrosion, humidity, chemicals, vibrations, and dust. The example enclosures discussed herein can be one or more of a number of different types of enclosures, including but not limited to explosion-proof enclosures, junction boxes, control panels, plugs/receptacles, lighting panels, lighting devices, motor control centers, switchgear cabinets, relay cabinets, and/or any other type of enclosure that can be used in a VLC network in a hazardous location. More information about hazardous locations and hazardous location enclosure can be found in Articles 500-506 and Articles 510-517 of the National Electric Code, which is incorporated herein by reference.

A user may be any person that interacts with the hazardous location enclosure or a VLC network in a hazardous location. Specifically, a user may program, operate, and/or interface with one or more components (e.g., a controller) associated with a VLC network and a hazardous location enclosure. Examples of a user may include, but are not limited to, an engineer, an electrician, an instrumentation and controls technician, a mechanic, an operator, a consultant, a contractor, and a manufacturer's representative.

Example embodiments of VLC networks in hazardous locations will be described more fully hereinafter with reference to the accompanying drawings, in which example embodiments of VLC networks in hazardous locations are shown. VLC networks in hazardous locations may, however, be embodied in many different forms and should not be construed as limited to the example embodiments set forth herein. Rather, these example embodiments are provided so that this disclosure will be thorough and complete, and will fully convey the scope of VLC networks in hazardous locations to those or ordinary skill in the art. Like, but not necessarily the same, elements (also sometimes called components) in the various figures are denoted by like reference numerals for consistency.

Figure 1:
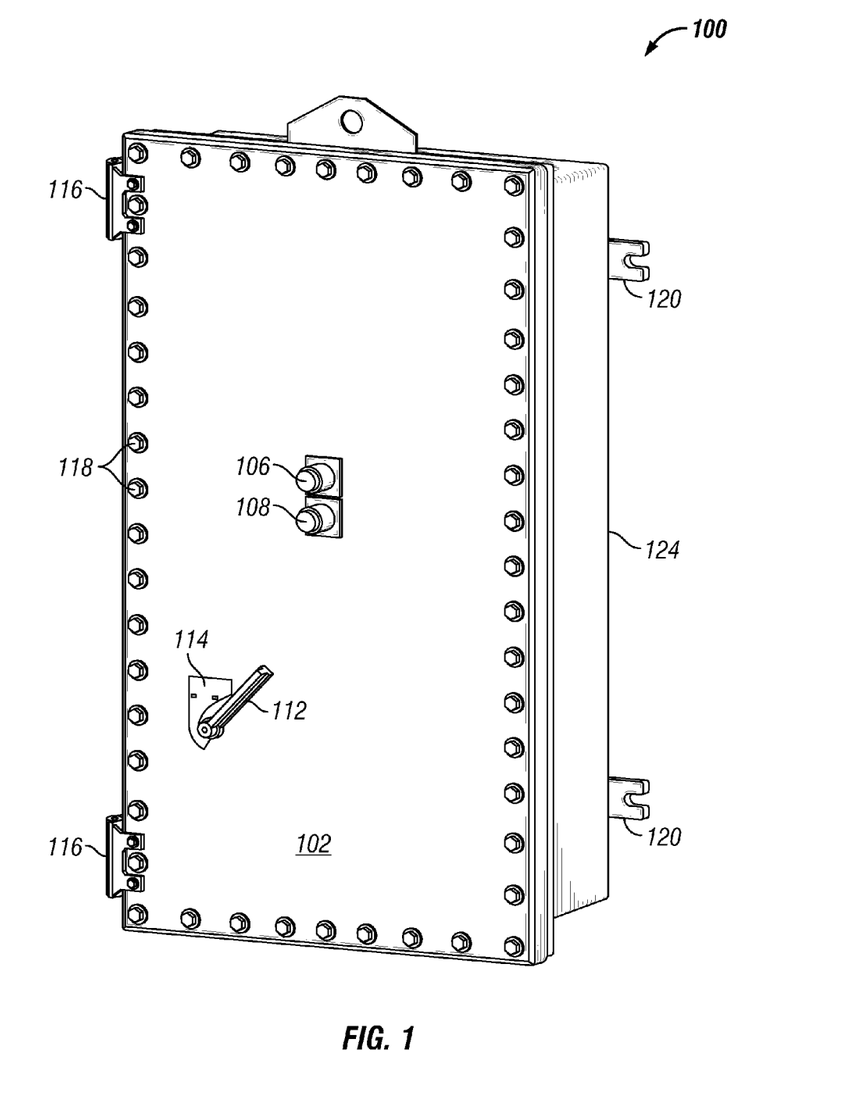
FIG. 1 shows a hazardous location enclosure in which one or more example embodiments of VLC networks may be implemented.

FIG. 1 shows a hazardous location enclosure in which one or more example embodiments of VLC networks may be implemented. In one or more example embodiments, one or more of the components shown in FIG. 1 may be omitted, repeated, and/or substituted. Accordingly, example embodiments of a hazardous location enclosure should not be considered limited to the specific arrangements of components shown in FIG. 1.

Referring now to FIG. 1, an example of a hazardous location enclosure 100 in a closed position is shown. The enclosure cover 102 is secured to the enclosure body 124 by a number of fastening devices 118 located at a number of points around the perimeter of the enclosure cover 102. In one or more example embodiments, a fastening device 118 may be one or more of a number of fastening devices, including but not limited to a bolt (which may be coupled with a nut), a screw (which may be coupled with a nut), and a clamp.

In addition, one or more hinges 116 are secured to one side of the enclosure cover 102 and a corresponding side of the enclosure body 124 so that, when all of the fastening devices 118 are removed, the enclosure cover 102 may swing outward (i.e., an open position) from the enclosure body 124 using the one or more hinges 116. In one or more example embodiments, there are no hinges, and the enclosure cover 102 is separated from the enclosure body 124 when all of the fastening devices 118 are removed. The enclosure cover 102 and the enclosure body 124 may be made of any suitable material, including metal (e.g., alloy, stainless steel), plastic, some other material, or any combination thereof. The enclosure cover 102 and the enclosure body 124 may be made of the same material or different materials.

In one or more example embodiments, on the end of the enclosure body 124 opposite the enclosure cover 102, one or more mounting brackets 120 are affixed to the exterior of the enclosure body 124 to facilitate mounting the enclosure 100. Using the mounting brackets 120, the enclosure 100 may be mounted to one or more of a number of surfaces and/or elements, including but not limited to a wall, a control cabinet, a cement block, an I-beam, and a U-bracket.

The enclosure cover 102 may include one or more features that allow for user interaction while the enclosure 100 is sealed in the closed position. As shown in FIG. 1, one or more light sources (e.g., indicating light 230, indicting light 108) may be located on the enclosure cover 102. Each indicating light may be used to indicate a status of a feature, process, device, and/or component associated with equipment inside and/or communicably coupled to the enclosure 100. For example, a light source may show a constant green light if a motor controlled by a variable frequency drive (VFD) inside the enclosure 100 is operating. As another example, a light source may flash red or show constant red when a motor controlled by a VFD inside the enclosure 100 is not operating properly (e.g., tripped circuit, VFD overheats, overcurrent situation). A light source may be made of one or more materials (e.g., glass, plastic) using one or more of a number of different lighting sources (e.g., light-emitting diode (LED), incandescent bulb).

In one or more example embodiments, the enclosure cover 102 may also include one or more of a number of other features, including but not limited to a switch handle 112, a viewing window, a meter, a digital display, and a pushbutton. Regardless of the existence or absence of such features, the hazardous location enclosure 100 used in conjunction with an example VLC network in a hazardous location includes at least one indicating light.

Figure 2:
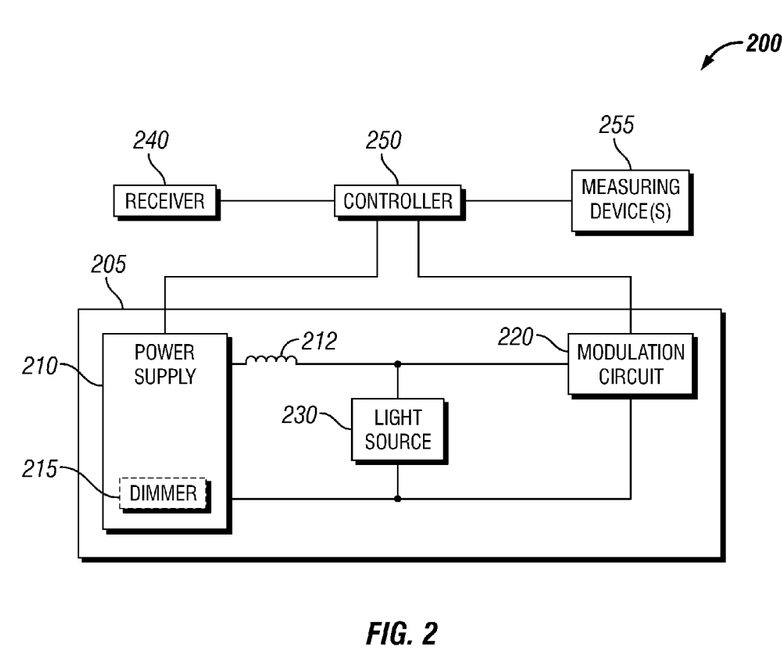
FIG. 2 shows a system diagram of a VLC structure for an enclosure in a hazardous location in accordance with certain example embodiments.

FIG. 2 shows a system diagram 200 of a VLC structure for an enclosure in a hazardous location in accordance with certain example embodiments. The system diagram 200 includes a lighting circuit 205, a receiver 240, a controller 250, and one or more measuring devices 255. The lighting circuit 205 of FIG. 2 includes a power supply 210, a modulation circuit 220, one or more light sources 230, and an inductor 212. The power supply 210 can optionally include a dimmer 215. In one or more example embodiments, one or more of the components shown in FIG. 2 may be omitted, repeated, and/or substituted. Accordingly, example embodiments of a VLC structure for an enclosure in a hazardous location should not be considered limited to the specific arrangements of components shown in FIG. 2.

Referring to FIG. 2, in certain example embodiments, the power supply 210 and the modulation circuit 220 are both connected in parallel with the light source 230 to form the lighting circuit 205. In certain embodiments, one or more of a number of other components (e.g., an inductor 212, a capacitor, a resistor, a switch, an integrated circuit) can be used in the lighting circuit 205 between the power supply 210, the modulation circuit 220, and/or the light source 230.

The receiver 240 is a device that receives the VLC signal, emitted as part of the light output generated by a light source of a different enclosure, and interprets the VLC signal. The receiver 240 of the enclosure 200 can be a stand-alone device that is physically separate from the enclosure 200, but within a line of sight of the light emitted from the light source of an adjacent enclosure. An example of a receiver 240 is an optical sensor (e.g., a photocell). The receiver 240 can search for a light output (and, thus, a VLC signal) on a regular basis (e.g., constantly, every 30 seconds), based on the occurrence of some event (e.g., the start of a piece of equipment), and/or based on some other factor.

In certain example embodiments, the receiver 240 and the modulation circuit 220 are communicably coupled to the controller 250 so that the modulation circuit 220 generates a visible light signal based on a VLC signal received by the receiver 240. As such, the enclosure 200 can act as a relay in a series of devices in a VLC network, as described below with respect to FIG. 3.

The light source 230 can be part of a light fixture or standalone. The light source 230 can be one or more light sources of any type of light source. In a VLC network, each light source can be of the same or a different type of light source from the other light sources in the VLC network. The light source 230, the power supply 210, the dimmer 215, the receiver 240, the controller 250, the measuring devices 255, and the modulation circuit 220 can be positioned within the same housing and/or in separate locations. The light source 230 can emit light output when current flows through the light source. Such a light output can include a non-VLC signal component (or, more simply, a non-VLC signal) and, in some embodiments, a VLC signal component (or, more simply, a VLC signal). The light output of the light source 230 can be detected by a receiver of one or more adjacent enclosures.

In certain example embodiments, the power supply 210 is a device or series of components that supply power to the light source 230. Specifically, the power supply 210 receives power from a source, processes the power, and delivers the processed power to the light source 230. The power supply 210 can also receive, process, and/or deliver control signals to the light source 230. The control signals and/or processed power (collectively referred to as a power signal) can be received by the light source 230 from the power supply 210 using wired and/or wireless technology. Similarly, the signals (e.g., power, control) received by the power supply 210 from external sources can be received using wired and/or wireless technology.

The power supply 210 can be located inside of a housing (e.g., hazardous location enclosure, light fixture), coupled to an exterior surface of such a housing, or positioned remotely from such a housing. The power supply 210 can include one or more discrete components (e.g., transformer, resistor, relay), one or more hardware processors, any other suitable circuitry, or any combination thereof. Thus, the power supply 210 can include software, hardware, or any combination thereof. In certain circuits (e.g., when the light source 230 is a LED), the power supply 210 can be called a driver or a LED driver.

The optional dimmer 215 of the power supply 210, if included, can control the amount of power (adjusts the power signal) delivered by the power supply 210 to the light source 230. The dimmer 215 can be controlled remotely by a user and/or by some other source. By controlling the power signal delivered by the power supply 210 to the light source 230, the dimmer 215 controls the amount of light output by the light source 230. The dimmer 215 can be part of the power supply 210, or the dimmer 215 can be a separate device from the power supply 210.

The modulation circuit 220 controls the VLC signal component of the light emitted by the light source 230. Specifically, the modulation circuit 220 sends, in parallel with the power signal sent by the power supply 210, a varying amount of power (the visible light signal) to the light source 230. The visible light signal generated by the modulation circuit 220 can be set at a different frequency (e.g. more than one GHz) relative to the frequency (e.g., 120 Hz) of the power signal generated by the power supply 210. The power signal sent by the power supply 210 to the light source 230 is added to the visible light signal sent by the modulation circuit 220 to the light source 230, and the light source 230 emits light based on the sum of the power signal received from the power supply 210 and the visible light signal received from the modulation circuit 220. In such a case, the light emitted by the light source can include a VLC signal component. The modulation circuit 220 can be part of the power supply 210, or the modulation circuit 220 can be a separate device from the power supply 210.

The varying amount of power (also called a visible light signal) sent by the modulation circuit 220 to the light source 230 translates directly into the VLC signal as output by the light source 230. In other words, the power signal received by the light source 230 from the power supply 210 is constant, regardless of whether a dimmer 215 is present in the lighting circuit 205. Put another way, the dimmer 215 is used to control the amount of power signal delivered by the power supply 210 to the light source 230, and is not used in the VLC functionality of the circuit 200.

In certain example embodiments, the modulation circuit 220 operates at a modulation level, which is the maximum amplitude of the visible light signal sent by the modulation circuit 220 to the light source 230. The modulation level of the modulation circuit 220 is typically a very small amount (e.g., less than 2%) compared to the amplitude of the power signal sent by the power supply 210 to the light source 230. For example, if the power signal delivered by the power supply 210 to the light source 230 is 1.0 A, then the modulation level of the modulation circuit 220 can be less than approximately 20 mA.

If the modulation level of the visible light signal delivered by the modulation circuit 220 to the light source 230 is too large (e.g., greater than approximately 2% of the amplitude of the power signal sent by the power supply 210 to the light source 230), then the light emitted by the light source 230 can have a flicker discernable by the human eye. Thus, because the modulation level generated by the modulation circuit 220 is so low relative to the amplitude of the power signal delivered by the power supply 210 to the light source 230, the signal-to-noise ratio (SNR) of the VLC signal of the light output of the light source 230 can be low.

In certain example embodiments, the controller 250 is communicably coupled to the optional dimmer 215, the modulation circuit 220, the power supply, and the receiver 240. The controller 250 can include software and/or hardware. Examples of such hardware can include, but are not limited to, an integrated circuit, a programmable logic controller, one or more discrete components (e.g., resistor, capacitor), and one or more switches. The controller 250 can include, or be operatively coupled to, a timer. The optional timer can be used to track one or more periods of time, to clock a frequency (as for the visible light signal and/or the power signal), for some other purpose, or any combination thereof.

The controller 250 can determine a condition of an electrical device and/or the occurrence of an event located within or proximate to the enclosure 200. As such, one or more measuring devices 255 (e.g., temperature sensors, relay signals, smoke detectors, pressure sensors, volt meters, ammeters,) can be communicably coupled to the controller 250. In such a case, the controller 250 can create a VLC signal and instruct the modulation circuit 220 to send a corresponding visible light signal to be sent to the light source 230. The controller 250 can also initiate, directly or indirectly, the power supply 210 (with or without the dimmer 215) to send a power signal to the light source 230.

When the receiver 240 receives a VLC signal, the controller instructs the modulation circuit 220 to send a corresponding visible light signal to be sent to the light source 230. Similarly, the controller 250 can also initiate, directly or indirectly, the power supply 210 (with or without the dimmer 215) to send a power signal to the light source 230. In certain example embodiments, the controller 250 uses one or more of a number of protocols and/or algorithms to determine, based on a reading from one or more measuring devices 255, a condition in the hazardous location. Further, the controller can use one or more protocols that are used to communicate a VLC signal within the VLC network. Such protocols and/or algorithms can be stored in memory on the controller 250. Such protocols and/or algorithms can be updated by a user, automatically, or by some other source on any random or fixed time interval.

The visible light signal generated by the modulation circuit 220 can come in one or more of a number of formats that conform to a VLC protocol. For example, when the modulation level of the modulation circuit 220 is 20 mA, the VLC protocol can operate on a binary system (zeros and ones), and so the visible light signal can be zero (to correspond to a binary zero) or 20 mA (to correspond to a binary one). The VLC protocol can be communicated between, and followed by, the modulation circuit 220, the receiver 240, and the controller 250 that initiates the VLC signal.

Figure 3:
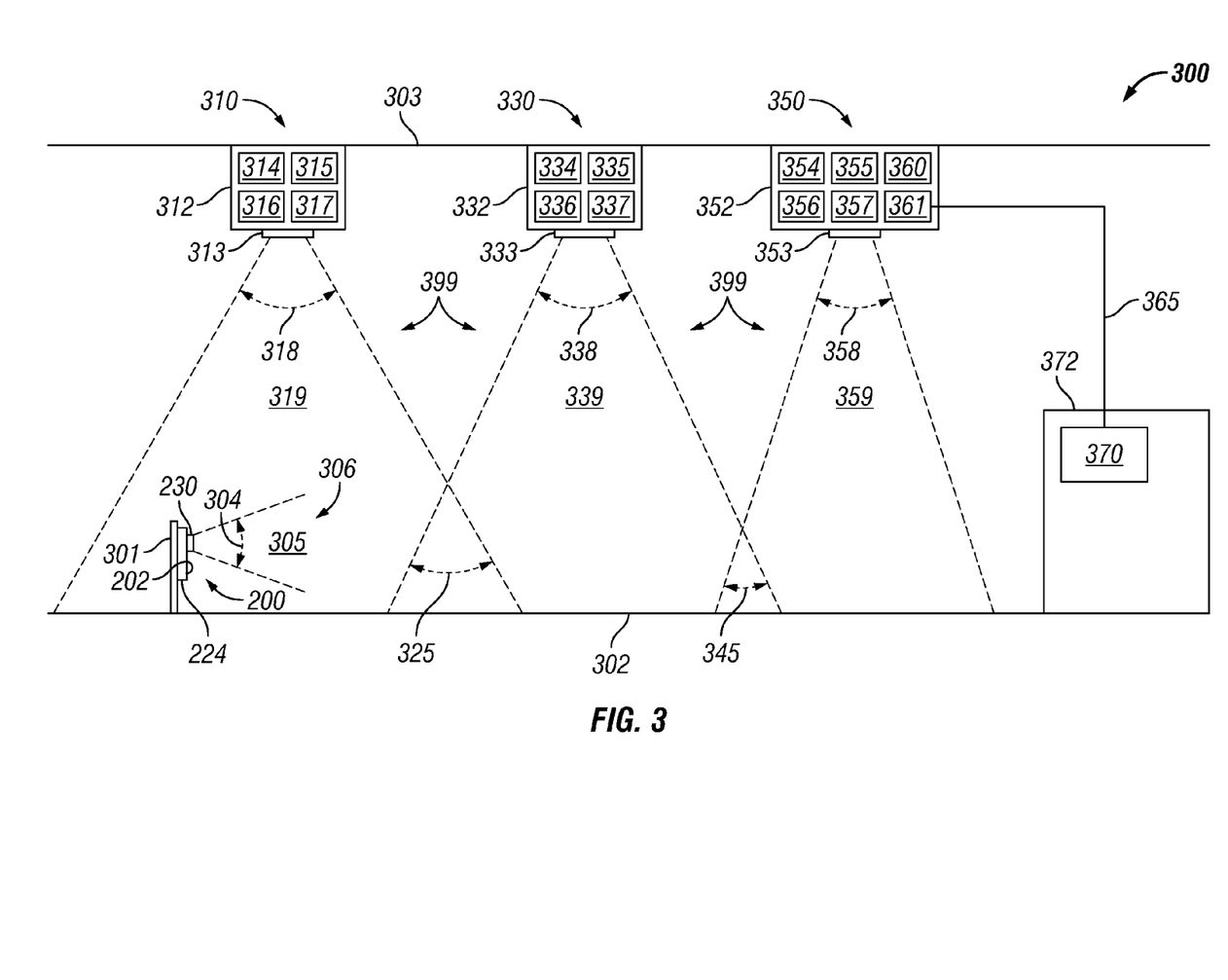
FIG. 3 shows a VLC network in a hazardous location in accordance with certain example embodiments.

FIG. 3 shows a VLC network 300 in a hazardous location in accordance with certain example embodiments. The hazardous location can include one or more of the hazardous conditions, described above. In one or more example embodiments, one or more of the components shown in FIG. 3 may be omitted, repeated, and/or substituted. Accordingly, example embodiments of a VLC network should not be considered limited to the specific arrangements of components shown in FIG. 3. For example, the elements (e.g., receiver, modulation circuit, controller, power supply, translation module, communication module) shown in an enclosure in FIG. 3 can be discrete elements or combined with one or more other elements of the enclosure. As another example, one or more of the elements shown in FIG. 3 to be located inside of an enclosure can be located outside (e.g., disposed on, remotely) the enclosure.

Referring to FIGS. 1-3, the VLC network 300 of FIG. 3 includes an enclosure 200, an enclosure 310, an enclosure 330, and a base device 350. The example enclosure 200 of FIG. 3 is substantially similar to the enclosure 200 described above with respect to FIG. 2. In this case, the enclosure 200 of FIG. 3 includes an light source 230 that is disposed on the cover 202 of the enclosure 200. The cover 202 is mechanically coupled to the body 224 of the enclosure 200. The body 224 of the enclosure 200 is mounted to a post 301 in the hazardous location 399. In certain example embodiments, the enclosure 200 can be any type of enclosure from which a light source (e.g., the light source 230) can illuminate and direct light away from the enclosure.

The light source 230 can, in certain circumstances and/or under certain conditions, illuminate. Alternatively, the light source 230 can always be illuminated. The light source 230 can enter one or more of a number of different modes of operation (e.g., flashing at constant and/or variable intervals, constantly on). A mode of operation of the light source 230 can change based on one or more of a number of events, including but not limited to the passage of time, a change in operation of an electrical device, and an emergency condition.

The enclosure 200 can include a controller 250 (not shown) that is communicably coupled to one or more measurement devices 255 (not shown). Each measurement device can be located inside of our outside body 224 the enclosure 200. In addition, the enclosure 200 can include, or have feeding therethrough, a source of power and/or control for one or more electrical devices. The electrical device can be any device that uses electricity to operate. Examples of such electrical devices can include, but are not limited to, a motor, a relay, a control system, a meter, a measuring device, a personal digital assistant (PDA), and a light source 230.

For example, if the electrical device is a PDA (or some other type of personal safety monitor) that is approved for use in a hazardous location, the PDA can be used to communicate (e.g., by modulating a flash of the light emitted from a light source) to the VLC network 300. In such a case, the PDA can provide control input (e.g., set dimming levels) to a lighting system (and/or other enclosure types) in the hazardous location. Similarly, by using an optical sensor (a type of receiver), the PDA can receive output from the visible light network in real-time. For example, the PDA can be used within the VLC network 300 to identify specific light fixtures in the hazardous location that may require maintenance. In certain example embodiments, individuals carrying such a PDA within a hazardous location can be informed in real-time, using the PDA and the VLC network 300, whether a hazardous condition has changed and/or to receive important information about a hazardous condition in the hazardous location. In such a case, the PDA can also be a type of enclosure.

In certain example embodiments, the light source 230 or a component of the enclosure 200 that is communicably coupled to the light source 230 includes a receiver (not shown). The enclosure 200 can include a modulation circuit (not shown) that controls the input signal flowing through the light source 230 to illuminate the light source 230. Specifically, the modulation circuit can be used to generate a visible light signal as part of the input signal. In such a case, the light output 305 of the light source 230 can include a VLC signal.

As the light source 230 generates a light output 305, the light output 305 is directed away from the enclosure 200 in a certain pattern 304. The pattern 304 of the light output 305 can vary depending one or more of a number of factors, including but not limited to characteristics, shape, and/or size of a lens, shape and/or size of a hood, and location of any obstacles outside the enclosure 200. Further, the light output 305 within the pattern 304 can travel a certain distance, depending on the strength of the light source within the light source 230.

In addition, or in the alternative, an enclosure can emit other types of light that are outside of light that is visible to the human eye. For example, an enclosure can emit infrared (IR) signals using an IR source. In such a case, the receiver of an adjacent enclosure can be capable of receiving the IR signal from the IR source of the enclosure. Similarly, the controller of the adjacent enclosure can be capable of parsing the VLC signal from the IR signal. An enclosure can emit such other types of light, for example, when the light source (e.g., light source 230) is off.

In certain embodiments, the pattern 304 of the light output 305 falls within line of sight 318 of a receiver 314 of a light source 310. Specifically, the receiver 314 of the enclosure 310 (in this case, a lighting device) can detect the light output 305 of the enclosure 200. Even more specifically, the receiver 314 can detect and, in some cases, interpret, the VLC signal in the light output 305. In such a case, the receiver 314 of the enclosure 310 triggers the power supply 315 (assuming the power supply 315 is not already delivering a power signal to the light source 313). The intersection of the pattern 304 of the light source 230 and the line of sight 318 of the receiver 314 of the enclosure 310 is shown in FIG. 3 as area 306.

In addition, the receiver 314 can send the VLC signal to the modulation circuit 317 of the enclosure 310. In such a case, the modulation circuit 317 can generate, based on the VLC signal, a visible light signal that, along with the power signal generated by the power supply 315, is received by the light source 313 as an input signal. In certain example embodiments, the enclosure 310 includes a controller 316 that controls the receiver 314, the power supply 315, and/or the modulation circuit 317. While the controller 316, the receiver 314, the power supply 315, and the modulation circuit 317 are shown in FIG. 3 to be located inside the housing 312 of the enclosure 310, one or more of these components can be located outside the housing 312 and remain operatively coupled to each of the other components of the enclosure 310.

When the light source 313 receives the input signal from the power supply 315 and the modulation circuit 317, the light source 313 illuminates and distributes a light output 319, which includes the VLC signal, in a manner similar to that described above with respect to the light output 305 of the light source 230. Here, the light output 319 of the light source 313 is directed away from the enclosure 310 in a pattern 318 toward the ground 302.

While the enclosure 310 is shown in FIG. 3 as being mounted on a ceiling 303, the enclosure 310 can be mounted on any other surface and/or device, and the light source 313 can be directed in any direction, as long as the pattern 318 of the light source 313 is within the line of sight of the receiver 334 of the enclosure 330 (in this case, another lighting device). The intersection of the pattern 318 of the light source 313 and the line of sight 338 of the receiver 334 of the enclosure 330 is shown in FIG. 3 as area 325. Likewise, for a VLC signal being sent in the opposite direction, the pattern 318 of the light source 313 can be within the line of sight of the receiver (not shown) of the enclosure 200.

While the line of sight 318 of the receiver 314 and the pattern 318 of the light source 313 of the enclosure 310 is shown in FIG. 3 to be substantially the same, the line of sight of the receiver 314 can be wider than or narrower than the pattern of the light source 313. Further, the area to which the receiver 314 directs its line of sight and to which the light source 313 directs its pattern can completely overlap, partially overlap, or have no overlap.

As shown in FIG. 3, the enclosure 330 is substantially similar to the enclosure 310 described above. Specifically, the enclosure 330 includes the receiver 334, a power supply 335, a modulation circuit 337, and an optional controller 336, all of which can be located inside a housing 332 of the enclosure 330. Also, a light source 333 is disposed on an outer surface of the housing 332. The enclosure 330 and its components can behave similarly to the corresponding components of the enclosure 310.

Specifically, the receiver 334 can receive and send the VLC signal to the modulation circuit 337 of the enclosure 330. In such a case, the modulation circuit 337 can generate, based on the VLC signal, a visible light signal that, along with the power signal generated by the power supply 335, is received by the light source 333 as an input signal. In certain example embodiments, the enclosure 330 includes a controller 336 that controls the receiver 334, the power supply 335, and/or the modulation circuit 337. While the controller 336, the receiver 334, the power supply 335, and the modulation circuit 337 are shown in FIG. 3 to be located inside the housing 332 of the enclosure 330, one or more of these components can be located outside the housing 332 and remain operatively coupled to each of the other components of the enclosure 330.

When the light source 333 receives the input signal from the power supply 335 and the modulation circuit 337, the light source 333 illuminates and distributes a light output 339, which includes the VLC signal, in a manner similar to that described above with respect to the light output 319 of the light source 313. Here, the light output 339 of the light source 333 is directed away from the enclosure 330 in a pattern 338 toward the ground 302.

As with enclosure 310, while the enclosure 330 is shown in FIG. 3 as being mounted on the ceiling 303, the enclosure 330 can be mounted on any other surface and/or device, and the light source 313 can be directed in any direction, as long as the pattern 338 of the light source 333 is within the line of sight of the receiver 354 of the base device 350. Likewise, for a VLC signal being sent in the opposite direction, the pattern 338 of the light source 333 can be within the line of sight of the receiver 314 of the enclosure 310.

One or more other enclosures (e.g., lighting devices) can be included in this series. In such a case, each enclosure can include a receiver, a modulation circuit, a power supply, and a light source. Further, each enclosure would be within a line of sight of at least one other enclosure in the VLC network 300. Here, the end of the VLC communication is with the base device 350. The base device 350 is a type of enclosure.

In certain example embodiments, the VLC network 300 includes a base device 350. The base device 350 can represent an end point (beginning, end) in a daisy-chain of enclosures that transfer a VLC signal. The base device 350 can include a receiver 354, which has a line of sight 358 and can receive the VLC signal. The line of sight 358 of the receiver 354 overlaps the pattern 338 of the light output 339 of the enclosure 330, as shown in FIG. 3 by area 345.

When the receiver 354 receives the VLC signal, and when the base device 350 represents the end of the daisy-chain of enclosures that transfer the VLC signal, the VLC signal is sent to a translation module 360 of the base device 350. The base device 350 is a type of enclosure. In certain example embodiments, the translation module 360 translates the VLC signal received from an enclosure (e.g., from the light source 333 of enclosure 330) into a communication format.

Once in the translation module 360 translates the VLC signal into the communication format, a communication module 361 of the base device 350 can send the VLC signal in the communication format. The communication module 361 of the base device 350 can be communicably coupled to one or more information sources 370 (e.g., computer, control panel, alarm panel, cell phone, loudspeaker, siren) using wired and/or wireless technology. For example, as shown in FIG. 3, the communication module 361 is communicably coupled to an information source that is a control panel positioned in a control room 372 using a cable 365.

In this case, the control room 372 is outside the hazardous location 399, although the control room 372 can also be located in the same or a different hazardous location. Alternatively, the information source 370 (or other communication device) can be a stand-alone device not inside of a room. Each information source 370 can send VLC signals in the communication format to and/or receive VLC signals in the communication format from one or more base device (e.g., base device 350). The information source 370 can communicate (send to, receive from) a VLC signal to a user in a user format. Thus, the information source 370 can translate a VLC signal between a user format and a communication format. In certain example embodiments, the communication format is the same as the user format or the format used between enclosures.

The example base device 350 can also include a light source 353, a controller 356, and a power supply 355. In such a case, the base device 350 can initiate and/or relay a VLC signal using a light output of the light source 353. In certain example embodiments, the communication module 361 uses wired technology (e.g., cable 365), rather than wireless technology, to communicate a VLC signal in the communication format to an information source 370. As a result, one or more of the communication problems (e.g., excessive vibration, excessive noise) commonly at issue from using wireless technology in hazardous locations can be avoided and/or minimized.

In certain example embodiments, the base device 350 (and/or any other enclosure in the VLC network 300) can interpret the VLC signal and create its own separate VLC signal for one or more other light sources and/or enclosures. For example, if a VLC signal received by the base device 350 reports a fire in the hazardous location 399, the translation module 360 (or some other component) of the base device 350 can determine that a new VLC signal should be initiated to command lighting devices and/or other enclosures located along the safest exit routes to illuminate their light sources to provide safe egress for people in the hazardous location 399. In such a case, the translation module 360 of the base device 350 can determine which particular enclosures are along the exit route(s) and list them in the VLC signal.

Figure 4:
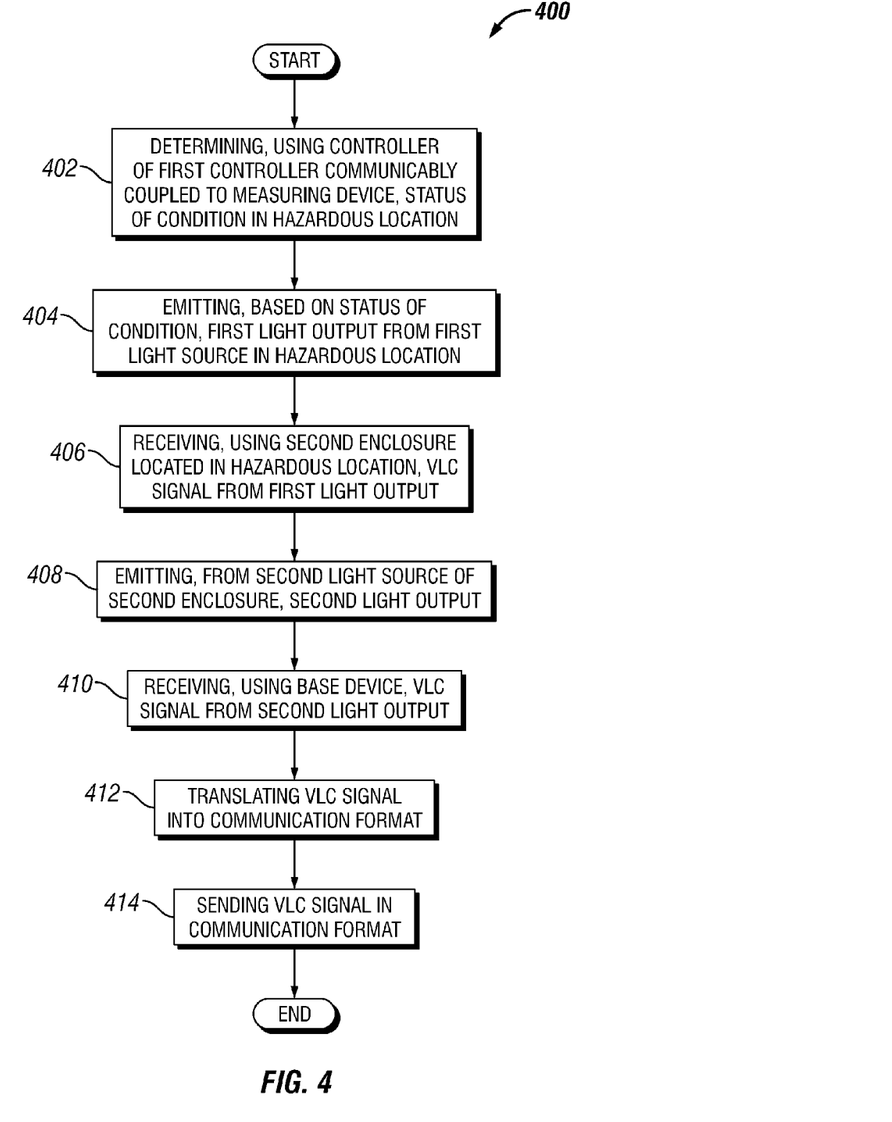
FIG. 4 is a flowchart presenting a method of communicating a condition in a hazardous location using a VLC network in accordance with certain example embodiments.

FIG. 4 is a flowchart presenting an example method 400 of communicating a condition in a hazardous location 399 in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 4, may be included in performing this method. Accordingly, the specific arrangement of steps should not be construed as limiting the scope. Further, a particular computing device, as described, for example, in FIG. 5 below, may be used to perform one or more of the steps for the method 400 described below.

Referring now to FIGS. 1-4, the example method 400 begins at the START step and proceeds to step 402, where the status of the condition in the hazardous location 399 is determined. In certain example embodiments, the status of the condition can be determined using a controller 250 communicably coupled to a measuring device 255. Specifically, a reading from a measuring device 255 and provided to the controller 250 can cause the controller 250, using one or more algorithms stored in the controller 250, to determine the condition. The controller 250 can be positioned within and/or communicably coupled to (is a part of) a first enclosure 200. In step 404, a first light output 305 from a first light source 230 is emitted in the hazardous location 399. The first light output 305 can be emitted based on the condition, as determined in step 402. In certain example embodiments, the first light output 305 includes a VLC signal that describes the condition. The first light output 305 is based on an input signal flowing through the light source 230. The input signal can include a power signal generated by the power supply 210 and a visible light signal generated by the modulation circuit 220. The controller 250 can instruct the modulation circuit 220 to generate the visible light signal and the power supply 210 to generate the power signal.

In certain example embodiments, the visible light signal is generated in accordance with a VLC protocol stored in the controller 250 and/or distributed throughout the VLC network 300. For example, the VLC protocol can be a binary system, where a binary "one" corresponds to the modulation level of the modulation circuit, and where a binary "zero" corresponds to no output of the modulation circuit. As another example, the VLC protocol can be a color-based system, where a color of the VLC signal corresponds to the condition.

In certain example embodiments, the first light output 305 is emitted from the first light source 230 is emitted constantly. Alternatively, the first light output 305 is emitted from the first light source 230 for a limited period of time (as measured, for example, by the timer in the controller 250). The first light output 305 can include the VLC signal when the condition has changed and/or when the condition (as determined by a protocol) triggers an alarm condition.

In step 406, the VLC signal from the first light output 305 is received. The VLC signal can be received using a second enclosure 310 located in the hazardous location 399. The VLC signal can be received using a receiver 314 of the second enclosure 310. In such a case, the receiver 314 of the second enclosure 310 can be within a line of sight of the light output 305 of the light source 230 of the first enclosure 200.

In certain example embodiments, when the VLC signal from the first light output 305 is received, the controller 316 of the second enclosure 310 can generate a subsequent VLC signal. Specifically, the controller 316 can instruct the modulation circuit 317 to generate the subsequent visible light signal and the power supply 315 to generate a subsequent power signal. The subsequent visible light signal and the subsequent power signal can create a subsequent input signal, which flows through the light source 313 to generate a subsequent light output, which includes the subsequent VLC signal. In such a case, the subsequent light output can be sent to, and received by, a different enclosure in the VLC network 300, in a manner similar to what is described herein. In response to receiving the subsequent VLC signal, the receiving enclosure can perform an operation (e.g., shut down an electrical device, sound an alarm, illuminate the light source of the enclosure).

In step 408, a second light output 319 is emitted. The second light output 319 can be emitted by a light source 313 of the second enclosure 310. The second light output 319 can include the VLC signal. The second light output 319 is based on an input signal flowing through the light source 313. The input signal can include a power signal generated by the power supply 315 and a visible light signal generated by the modulation circuit 317. The controller 316 can instruct the modulation circuit 317 to generate the visible light signal and the power supply 315 to generate the power signal.

In step 410, the VLC signal from the second light output 319 is received. In certain example embodiments, the VLC signal is received by a receiver 354 of a base device 350. In such a case, the receiver 354 is within a line of sight of the light output 319 of the light source 313. Alternatively, another (a third) enclosure 330 can be placed between the second enclosure 310 and the base device 350 in the VLC network 300. In such a case, the receiver 334 is within a line of sight of the light output 319 of the light source 313, and the receiver 354 of the base device 350 can be in a line of sight of the third light output 339 of the light source 333 of the third enclosure 330. Thus, the VLC signal from the second light output 319 can be received by the receiver 334 of the third enclosure 330.

In turn, the third light output 339 of the third light source 333 of the third enclosure 330 can be emitted in the hazardous location 399.

In step 412, the VLC signal is translated into a communication format. In certain example embodiments, the VLC signal is translated into the communication format by the translation module 360 of the base device 350. In step 414, the VLC signal is sent in the communication format. The VLC signal can be sent by the communication module 361 of the base device 350. The VLC signal can be sent to an information source 370 using a cable 365. The information source 370 can be located in a non-hazardous location. After step 414 is completed, the process returns to the END step.

Figure 5:
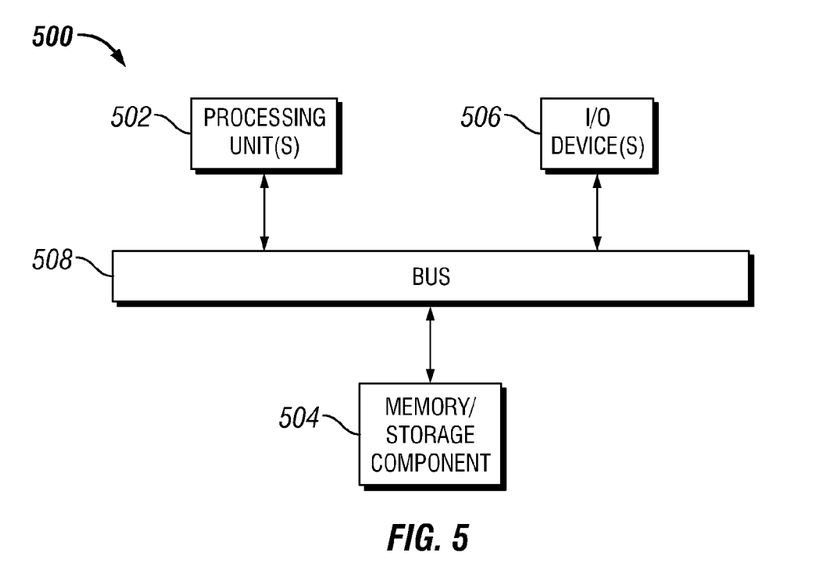
FIG. 5 shows a computer system used for communicating a condition in a hazardous location using a VLC network in accordance with certain example embodiments.

FIG. 5 illustrates one embodiment of a computing device 500 capable of implementing one or more of the various techniques described herein, and which may be representative, in whole or in part, of the elements described herein. Computing device 500 is only one example of a computing device and is not intended to suggest any limitation as to scope of use or functionality of the computing device and/or its possible architectures. Neither should computing device 500 be interpreted as having any dependency or requirement relating to any one or combination of components illustrated in the example computing device 500. As shown in FIG. 5, the bus 508 is operatively coupled to each of the processing unit(s) 502, the I/O device(s) 506, and the memory/storage component 504.

Computing device 500 includes one or more processors or processing units 502, one or more memory/storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Memory/storage component 504 may include volatile media (such as random access memory (RAM)) and/or nonvolatile media (such as read only memory (ROM), flash memory, optical disks, magnetic disks, and so forth). Memory/storage component 504 can include fixed media (e.g., RAM, ROM, a fixed hard drive, etc.) as well as removable media (e.g., a Flash memory drive, a removable hard drive, an optical disk, and so forth).

One or more I/O devices 506 allow a customer, utility, or other user to enter commands and information to computing device 500, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 500 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 500 includes at least the minimal processing, input, and/or output means necessary to practice one or more embodiments.

Further, those skilled in the art will appreciate that one or more elements of the aforementioned computer device 500 may be located at a remote location and connected to the other elements over a network. Further, one or more example embodiments may be implemented on a distributed system having a plurality of nodes, where each portion of the implementation (e.g. controller, modulation circuit, base device, enclosure) may be located on a different node within the distributed system. In one or more embodiments, the node corresponds to a computer system. Alternatively, the node may correspond to a processor with associated physical memory. The node may alternatively correspond to a processor with shared memory and/or resources.

In one or more example embodiments, example VLC networks in hazardous locations allow for more reliable communication of one or more conditions that exist in a hazardous location. Example VLC networks can operate substantially independent of, and in conjunction with, many hazards that exist in a hazardous location, including but not limited to heat, cold, moisture, vibration, and chemicals. Thus, using example embodiments described herein can improve communication, safety, maintenance, costs, and operating efficiency.

Accordingly, many modifications and other embodiments set forth herein will come to mind to one skilled in the art to which VLC networks in hazardous locations pertain having the benefit of the teachings presented in the foregoing descriptions and the associated drawings. Therefore, it is to be understood that VLC networks in hazardous locations are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A method of communicating a condition in a hazardous location, the method comprising:
   determining, using a controller of a first hazardous location electrical enclosure communicably coupled to a measuring device, the condition in the hazardous location;

emitting, based on the condition, a first light output from a first light source of the first hazardous location electrical enclosure in the hazardous location, wherein the first light output comprises a visible light communication (VLC) signal that describes the condition, and wherein the first light source emits light outside the first hazardous location electrical enclosure;

receiving, using a receiver of a second hazardous location electrical enclosure located in the hazardous location, the VLC signal from the first light output, wherein the receiver receives the VLC signal in the hazardous location;

emitting, from a second light source of the second hazardous location electrical enclosure, a second light output, wherein the second light output comprises the VLC signal, and wherein the second light source emits light outside the second hazardous location electrical enclosure;

receiving, using a base device, the VLC signal from the second light output;

translating the VLC signal into a communication format; and sending the VLC signal in the communication format, wherein the first hazardous location electrical enclosure, including the first light source, is located within and meets the applicable requirements for the hazardous location, wherein the second hazardous location electrical enclosure, including the receiver and the second light source, is located within and meets the applicable requirements for the hazardous location, and wherein the measuring device is located within and meets the applicable requirements for the hazardous location.

2. The method of claim 1, wherein the second light source is within a first line of sight of the first light output emitted by the first light source.

3. The method of claim 1, wherein the base device is within a second line of sight to the second light output emitted by the second light source.

4. The method of claim 1, wherein the first light output is emitted constantly, and wherein the first light output comprises the VLC signal when the condition triggers an alarm condition.

5. The method of claim 1, wherein the VLC signal of the first light output is based on a visible light signal generated by a modulation circuit of the first enclosure.

6. The method of claim 5, wherein the visible light signal is generated in accordance with a VLC protocol.

7. The method of claim 6, wherein the VLC protocol is a binary system, wherein a binary "one" corresponds to the modulation level of the modulation circuit, and wherein a binary "zero" corresponds to no output of the modulation circuit.

8. The method of claim 1, wherein the second light source, in response to the VLC signal, sends a subsequent VLC signal to a third enclosure, wherein the third enclosure performs an operation in response to the subsequent VLC signal.

9. The method of claim 1, further comprising:
receiving, using a third enclosure located in the hazardous location, the VLC signal from the second light output; and
emitting, from a third light source of the third enclosure, a third light output, wherein the third light output comprises the VLC signal,
wherein the base device receives the VLC signal from the third light output.

10. A visible light communication (VLC) network for a hazardous location, the VLC network comprising:
a first hazardous location electrical enclosure comprising a first light source and a first modulation circuit, wherein the first hazardous location electrical enclosure is located in the hazardous location and is communicably coupled to a measuring device, and wherein the first light source emits a first light output that comprises a VLC signal generated by the first modulation circuit, wherein the first light source emits light outside the first hazardous location electrical enclosure, and wherein the measuring device and the first hazardous location electrical enclosure, including the first light source, meet the applicable requirements for the hazardous location;
a second hazardous location electrical enclosure comprising a second light source, a first receiver, and a second modulation circuit, wherein the second hazardous location electrical enclosure is located in the hazardous location, wherein the first receiver is within a first line of sight of the first light output emitted by the first light source, and wherein the second light source emits a second light output that comprises the VLC signal generated by the second modulation circuit, wherein the first receiver receives the VLC signal in the hazardous location, wherein the second light source emits the second light outside the second hazardous location electrical enclosure, and wherein the second hazardous location electrical enclosure, including the second light source and the first receiver, meet the applicable requirements for the hazardous location; and
a base device comprising a second receiver and a translation module, wherein the second receiver is within the second line of sight of a second light output emitted by the second light source, and wherein the translation module translates the VLC signal into a communication format.

11. The VLC network of claim 10, further comprising:
a third light source comprising a third receiver and a third modulation circuit, wherein the third light source is located in the hazardous location, wherein the third receiver is within a third line of sight of the second light output emitted by the second light source of the second hazardous location electrical enclosure, and wherein the third light source emits a third light output that comprises the VLC signal generated by the third modulation circuit,
wherein the second receiver of the base device is within a third line of sight of the third light output emitted by the third light source.

12. The VLC network of claim 10, further comprising:
a personal safety device carried by a user and comprising a third receiver, wherein the third receiver receives the VLC signal, and wherein the personal safety device displays the VLC signal in the communication format to the user, wherein the VLC signal informs the user of a condition in the hazardous location.

13. The VLC network of claim 10, wherein the base device further comprises a communication module that sends the VLC signal in the communication format.

14. The VLC network of claim 13, further comprising:
an information source electrically coupled to the base device, wherein the information source receives the VLC signal in the communication format and communicates the VLC signal to a user in a user format.

15. The VLC network of claim 14, wherein the information source is electrically coupled to the base device using a cable.

16. The VLC network of claim 10, wherein the second hazardous location electrical enclosure further comprises a power supply electrically coupled to the second light source, wherein the power supply generates a power signal to illuminate the second light source.

17. The VLC network of claim 16, wherein the second light source further comprises a dimmer operatively coupled to the power supply, wherein the dimmer controls a magnitude of the power signal generated by the power supply.

18. The VLC network of claim 10, wherein the second modulation circuit is a power supply that modulates a frequency of the power signal.

19. The VLC network of claim 10, wherein the first receiver, the second modulation circuit, and the second light source are disposed in a housing of the second hazardous location electrical enclosure.

20. The VLC network of claim 10, wherein the first receiver is an optical sensor.

\* \* \* \* \*